US012803096B2

(12) United States Patent
Lin et al.

(10) Patent No.: US 12,803,096 B2
(45) Date of Patent: Nov. 17, 2026

(54) FISHING REEL BATTERY

(71) Applicant: Guangdong Yuantuo Technology Co., Ltd, Huizhou (CN)

(72) Inventors: Yuhang Lin, Huizhou (CN); Xiaohui Lin, Huizhou (CN); Yuqin Lin, Huizhou (CN)

( * ) Notice: Subject to any disclaimer, the term of this patent is extended or adjusted under 35 U.S.C. 154(b) by 408 days.

(21) Appl. No.: 18/668,870

(22) Filed: May 20, 2024

(65) Prior Publication Data

US 2024/0347835 A1 Oct. 17, 2024

(30) Foreign Application Priority Data

Sep. 26, 2023 (CN) ........................ 202322609296.4

(51) Int. Cl.

| | |
|---|---|
| ***H01M 50/242*** | (2021.01) |
| ***A01K 99/00*** | (2006.01) |
| ***H01M 50/213*** | (2021.01) |
| ***H01M 50/244*** | (2021.01) |
| ***H01M 50/247*** | (2021.01) |
| ***H01M 50/264*** | (2021.01) |
| ***H01M 50/271*** | (2021.01) |
| ***H01M 50/284*** | (2021.01) |
| ***H02J 7/70*** | (2026.01) |
| ***H02J 7/80*** | (2026.01) |

(52) U.S. Cl.

CPC ....... *H01M 50/242* (2021.01); *H01M 50/213* (2021.01); *H01M 50/244* (2021.01); *H01M 50/247* (2021.01); *H01M 50/264* (2021.01); *H01M 50/271* (2021.01); *H01M 50/284* (2021.01); *H02J 7/751* (2026.01); *A01K 99/00* (2013.01); *H01M 2220/30* (2013.01); *H02J 7/80* (2026.01); *H02J 2207/30* (2020.01)

(58) Field of Classification Search

None

See application file for complete search history.

(56) References Cited

FOREIGN PATENT DOCUMENTS

KR 20200121646 A * 10/2020 .......... H01M 50/258

OTHER PUBLICATIONS

English-language machine translation of KR-20200121646-A. (Year: 2026).*

* cited by examiner

*Primary Examiner* — Eli S Mekhlin

(74) *Attorney, Agent, or Firm* — Daniel M. Cohn; Howard M. Cohn

(57) ABSTRACT

The present invention belongs to the field of fishing equipment, especially a fishing reel battery, including: a case, two pairs of brackets being provided inside of the case, fixing grooves being provided inside of a plurality of brackets, and a plurality of batteries being provided between the two pairs of brackets; and a top base, provided on the top of the case, a charging and discharging interface being fixed on the inner wall of the top base. The cost of consumables can be saved, the fishing reel battery facilitates the fitting with fishing tackle, and the batteries can be positioned to avoid shaking and short circuit of the batteries.

4 Claims, 6 Drawing Sheets

FISHING REEL BATTERY

TECHNICAL FIELD

The present invention relates to the technical field of fishing equipment, and in particular, to a fishing reel battery.

BACKGROUND

As the function and material of fishing tackle are constantly updated and changed, the fishing reel is one of the necessary equipment. Considering that the hands of turning the fishing reel for too long are easily getting tired and manual operation of the fishing reel is laborious and time-consuming, an electric method is used instead of manual operation, while the fishing reel battery provides power for electric equipment.

The existing fishing reel battery is directly placed in the corresponding case, which is connected and fixed by screws. When in use, the case can be directly tied to the fishing tackle. However, there are the following shortcomings in use:

1. Most of the fixing mechanisms are installed on the outer wall of the case to form bulges, making it difficult for the case to fit well with the fishing tackle and easy to shake and fall off when pulling a giant object.

2. The internal structure of the case is simple, lacking special battery fixing brackets. After long-term use, the batteries are easy to loosen, easily causing the batteries to shake and be damaged. Moreover, there is no bracket for separation between the batteries, which easily causes a short circuit.

Therefore, a fishing reel battery is proposed.

SUMMARY

The object of the present invention is to propose a fishing reel battery, in order to solve the problems in the prior art that most of the fixing mechanisms are installed on the outer wall of the case to form bulges, making it difficult for the case to fit well with the fishing tackle and easy to shake and fall off when pulling a giant object; the internal structure of the case is simple, lacking special battery fixing brackets; after long-term use, the batteries are easy to loosen, easily causing the batteries to shake and be damaged; moreover, there is no bracket for separation between the batteries, which easily causes a short circuit.

In order to achieve the above object, the present invention adopts the following technical solutions:

A fishing reel battery, including a case, where two pairs of brackets are provided inside the case, fixing grooves are provided inside of a plurality of brackets, and a plurality of batteries are provided between the two pairs of brackets;

a top base, provided on the top of the case, where a charging and discharging interface is fixed on the inner wall of the top base, a connecting piece is provided at the bottom of the charging and discharging interface, the outer wall of the top base is rotationally connected with a knob, and internal threads are provided on the inner wall of the knob;

a bottom base, provided at the bottom of the case, where a plurality of assembly holes are provided throughout the surface of the top base and the bottom of the bottom base, both the top base and bottom base are fixed to the case through screws, and the outer walls of the case, top base and bottom base are defined with a plurality of positioning grooves; and a charging mechanism, provided at the bottom of the bottom base and used to power equipment.

In one possible design, the charging mechanism includes a circuit board, a TYPE-C output interface, a USB output interface, a switch and a power indicator light, the circuit board is fixed at the bottom inner wall of the bottom base; the TYPE-C output interface, USB output interface, switch and power indicator light are all provided at the bottom of the bottom base, and electrically connected to the circuit board; the circuit board is electrically connected to the batteries.

In one possible design, both the surface and bottom of the case are provided with positioning bumps, and both the bottom of the top base and the surface of the bottom base are defined with grooves adapted to the positioning bumps.

In one possible design, the positioning bumps are integrally formed around the case.

In one possible design, the outer wall of the top base is provided with a sealing cover.

In one possible design, the surface of the knob is provided with an adjustment arrow.

In the present application, during assembly, the charging and discharging interface passes through the top base and is then fixed using screws, the connecting piece is installed, the brackets and batteries are installed into the case, the top base is fixed to the case using the assembly holes, the circuit board is installed to the bottom inner wall of the bottom base, and the bottom base is fixed to the case using the assembly holes.

When in use, the case is fitted with the fishing tackle using the positioning grooves, straps are used for binding, and then the equipment is connected to the charging and discharging interface. The knob is rotated when connecting, and the equipment is limited using a threaded structure, preventing the equipment from falling off.

In the present invention, in the fishing reel battery, screws can pass through the assembly holes from the surface of the top base through the arrangement of assembly holes and grooves, and thus connect and fix the top base and the case, saving the cost of consumables required for bumps, and facilitating the fit with the fishing tackle.

In the present invention, the fishing reel battery is provided with brackets, which position the batteries to avoid the batteries from shaking inside the case, and at the same time prevent the problem of battery short circuit.

In the present invention, the fishing reel battery is provided with a plurality of structures such as a TYPE-C output interface, a USB output interface and a circuit board, which can not only facilitate people to charge the batteries, but also charge people's mobile phones, providing people with certain convenience.

In the present invention, the cost of consumables can be saved, the fishing reel battery facilitates fitting with the fishing tackle, the batteries can be positioned to avoid shaking and short circuit of the batteries, and it can also facilitate people to charge the batteries and charge people's mobile phones.

Figure 1:
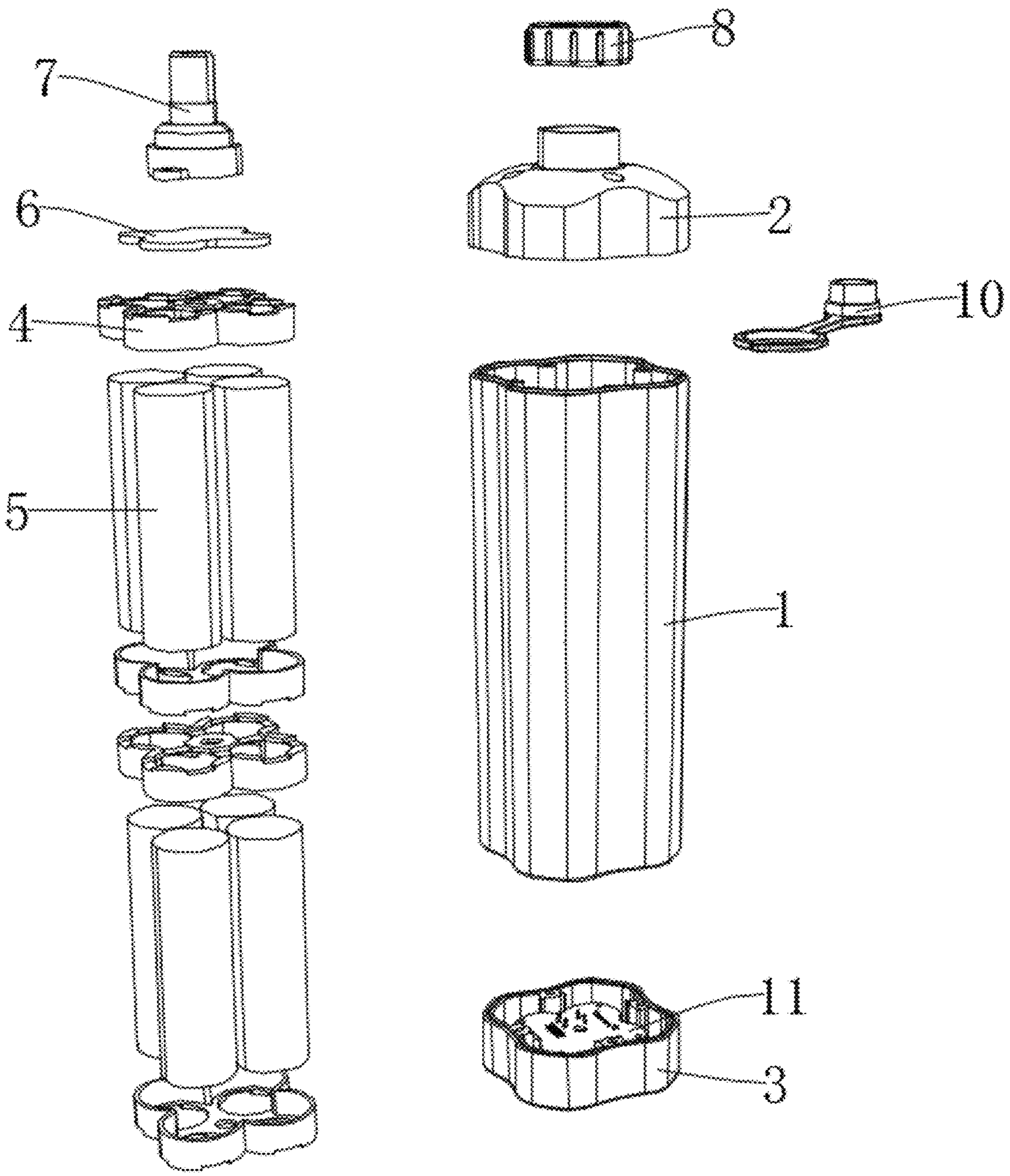
FIG. 1 is a schematic exploded structural diagram of a fishing reel battery provided in the present invention.

In the accompanying drawings: 1, case; 2, top base; 3, bottom base; 4, bracket; 5, battery; 6, connecting piece; 7, charging and discharging interface; 8, knob; 9, positioning groove; 10, sealing cover; 11, circuit board; 12, TYPE-C output interface; 13, USB output interface; 14, switch; 15, power indicator light; 16, assembly hole; 17, positioning bump; and 18, groove.

DETAILED DESCRIPTION

The technical solutions in the embodiments of the present invention will be clearly and completely described below with reference to the accompanying drawings in the embodiments of the present invention. Obviously, the described embodiments are only some, not all, of the embodiments of the present invention.

Embodiment 1

Referring to FIGS. 1-6, a fishing reel battery is used in the field of fishing equipment and includes a case 1, where two pairs of brackets 4 are provided inside the case 1, fixing grooves are provided inside of a plurality of brackets 4, and a plurality of batteries 5 are provided between the two pairs of brackets 4; a top base 2, provided on the top of the case 1, where a charging and discharging interface 7 is fixed on the inner wall of the top base 2, a connecting piece 6 is provided at the bottom of the charging and discharging interface 7, the outer wall of the top base 2 is rotationally connected with a knob 8, and internal threads are provided on the inner wall of the knob 8; a bottom base 3, provided at the bottom of the case 1, where a plurality of assembly holes 16 are provided throughout the surface of the top base 2 and the bottom of the bottom base 3, both the top base 2 and bottom base 3 are fixed to the case 1 through screws, and the outer walls of the case 1, top base 2 and bottom base are 3 defined with a plurality of positioning grooves 9; and a charging mechanism, provided at the bottom of the bottom base 3 and used to power equipment.

In the above technical solution, the brackets 4 are used to position the batteries 5 to prevent the batteries 5 from shaking, the charging and discharging interface 7 is used to connect the electric equipment, the knob 8 cooperates with the internal threads to limit the electric equipment, thus preventing the equipment from falling off, and the positioning grooves 9 are used for the fitting with the fishing tackle.

Figure 3:
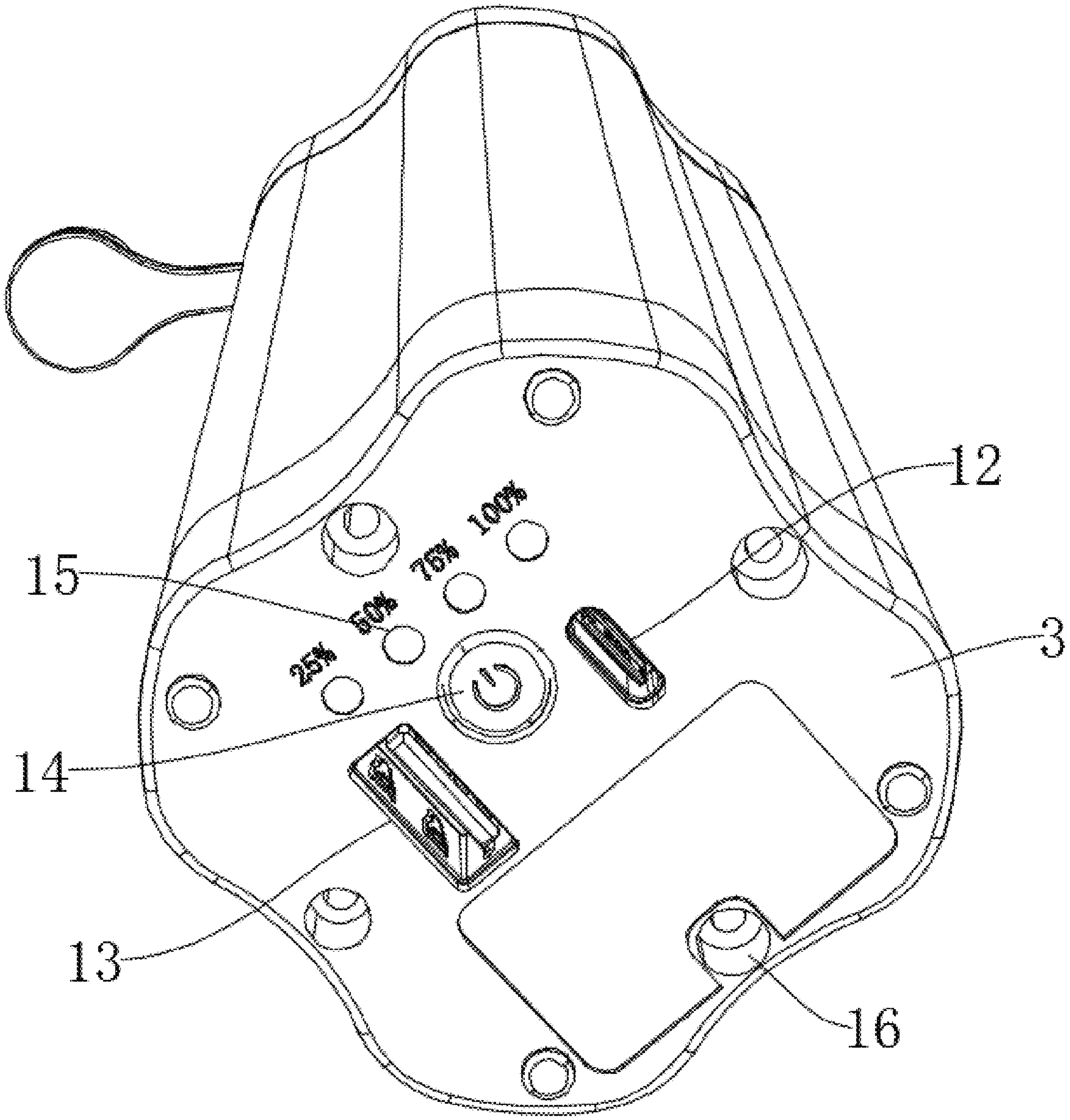
FIG. 3 is a schematic three-dimensional structural diagram of the fishing reel battery provided in the present invention from another angle.

In another aspect of this embodiment, as shown in FIGS. 1 and 3, the charging mechanism includes a circuit board 11, a TYPE-C output interface 12, a USB output interface 13, a switch 14 and a power indicator light 15. The circuit board 11 is fixed at the bottom inner wall of the bottom base 3. The TYPE-C output interface 12, USB output interface 13, switch 14 and power indicator light 15 are all provided at the bottom of the bottom base 3, and electrically connected to the circuit board 11. The circuit board 11 is electrically connected to the batteries 5.

In the above technical solution, the TYPE-C output interface 12 is used to charge the batteries 5, the USB output interface 13 is used to charge a mobile phone, and the power indicator light 15 is used to indicate the power level.

Embodiment 2

Figure 4:
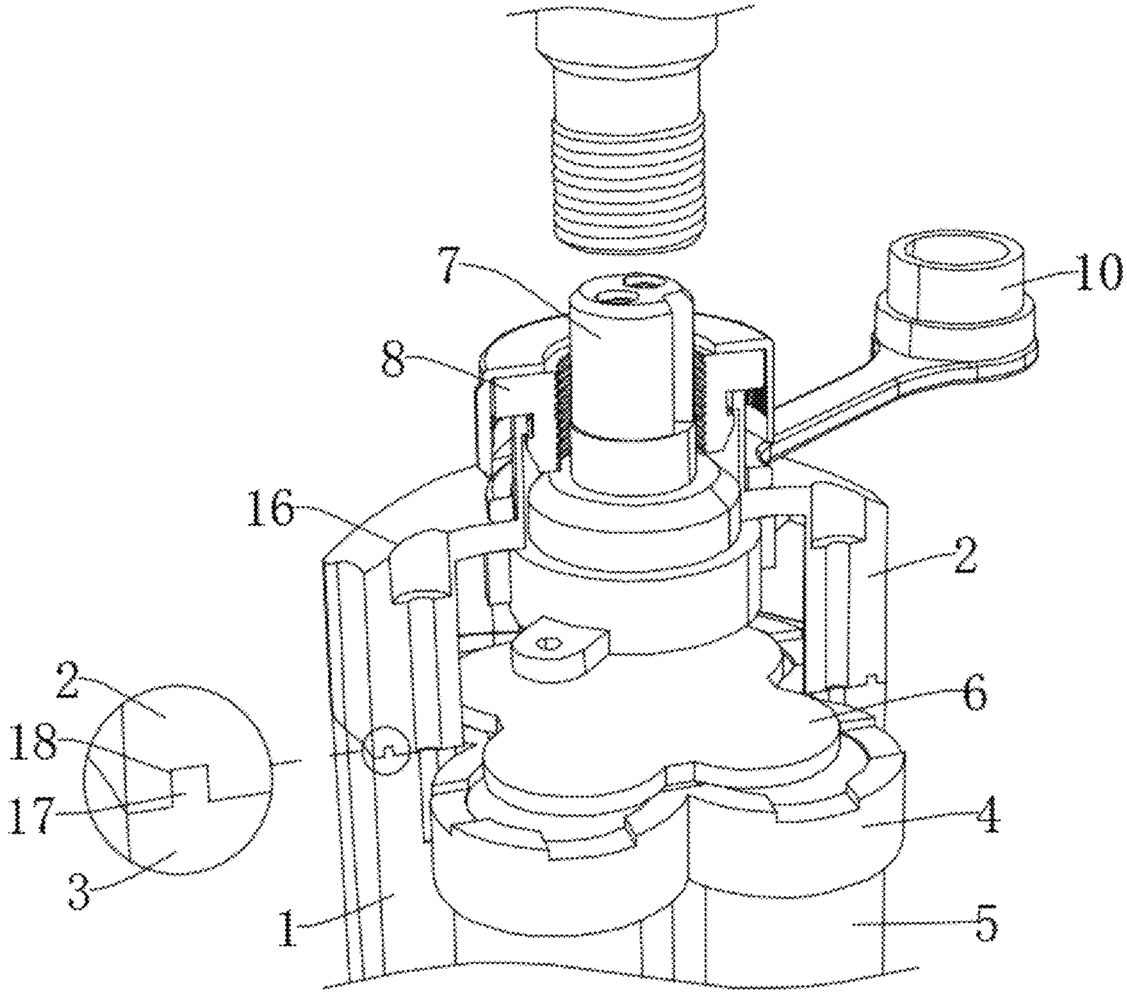
FIG. 4 is a schematic partial cross-sectional structural diagram of the fishing reel battery provided in the present invention.

Improved on the basis of Embodiment 1:

In another aspect of this embodiment, as shown in FIG. 4, both the surface and bottom of the case 1 are provided with positioning bumps 17, and both the bottom of the top base 2 and the surface of the bottom base 3 are defined with grooves 18 adapted to the positioning bumps 17.

In the above technical solution, the positioning bumps 17 cooperate with the grooves 18 to position the top base 2 and the bottom base 3, making it convenient for people to install the top base 2 and the bottom base 3.

Figure 6:
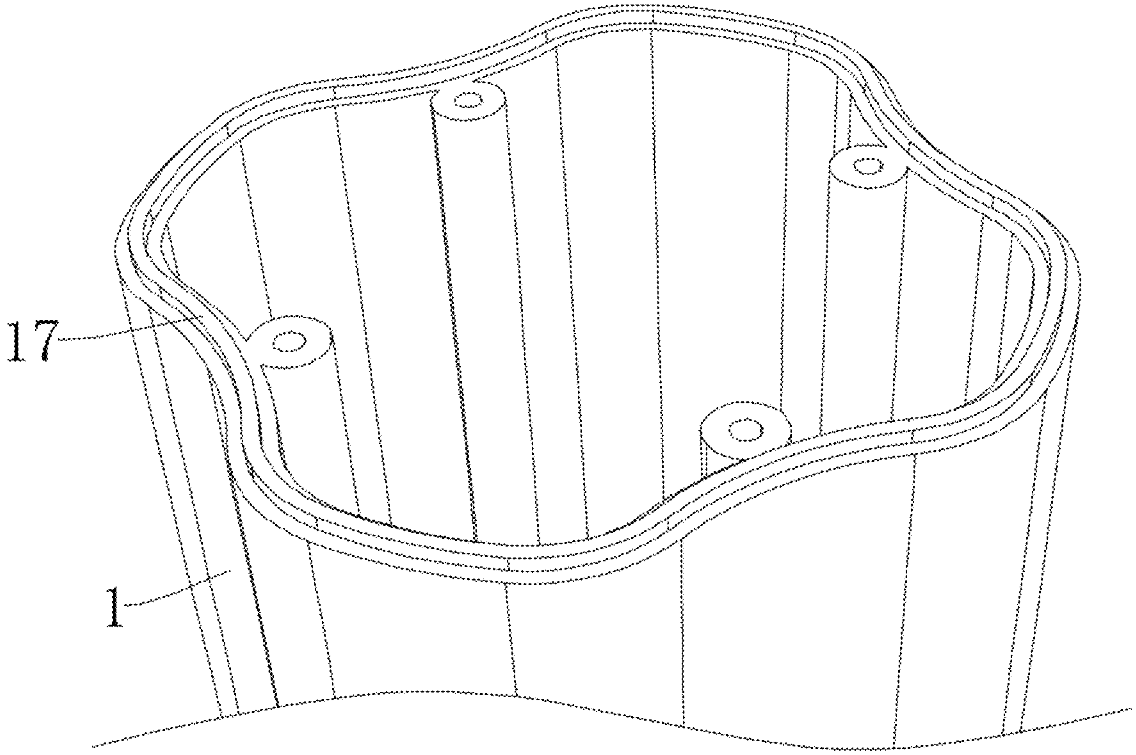
FIG. 6 is a schematic structural diagram of a case and positioning bumps of the fishing reel battery provided in the present invention.

In another aspect of this embodiment, as shown in FIG. 6, the positioning bumps 17 are integrally formed around the case 1.

In the above technical solution, optionally, the positioning bumps 17 can also be provided as a plurality of discontinuous bumps.

Figure 2:
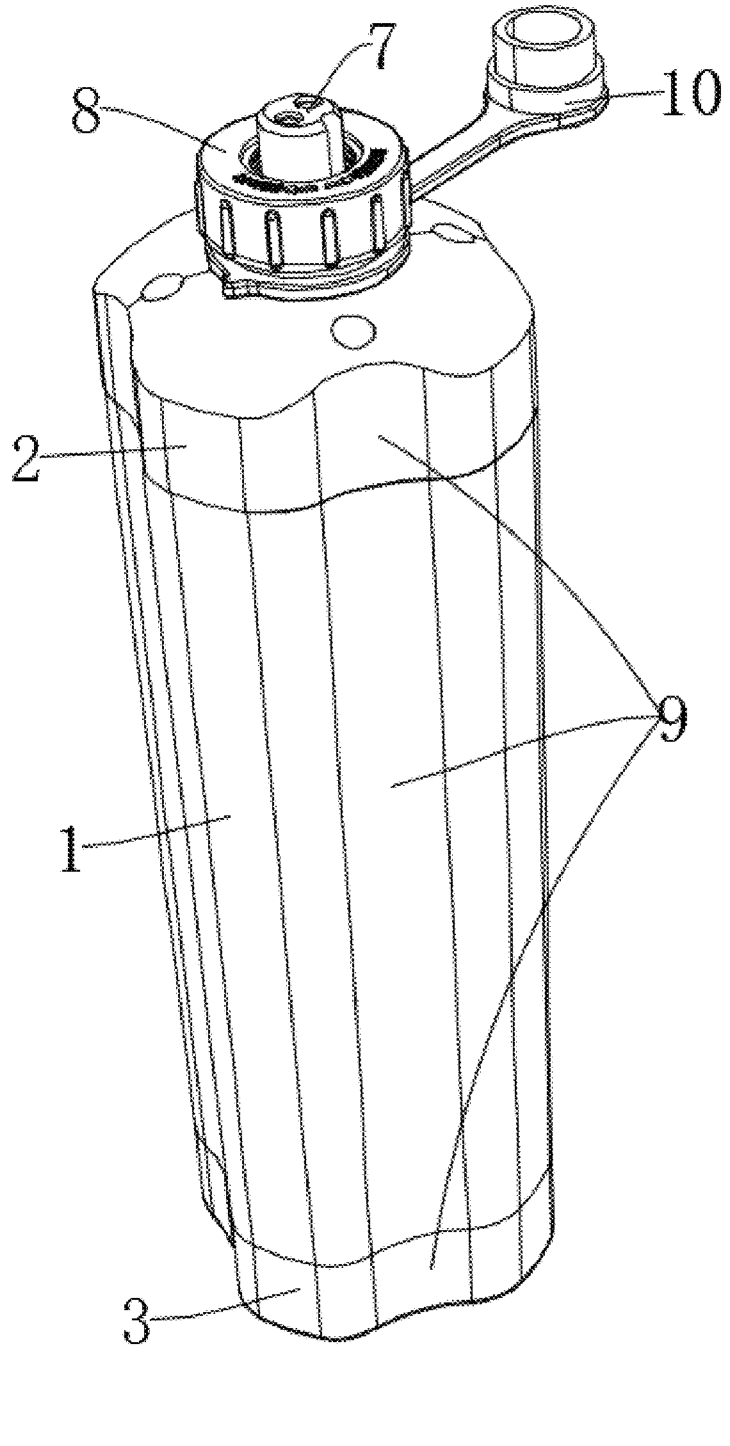
FIG. 2 is a schematic three-dimensional structural diagram of the fishing reel battery provided in the present invention.

In another aspect of this embodiment, as shown in FIGS. 1 and 2, the outer wall of the top base 2 is provided with a sealing cover 10.

In the above technical solution, the sealing cover 10 can seal the charging and discharging interface 7 to provide protection for the charging and discharging interface 7.

Figure 5:
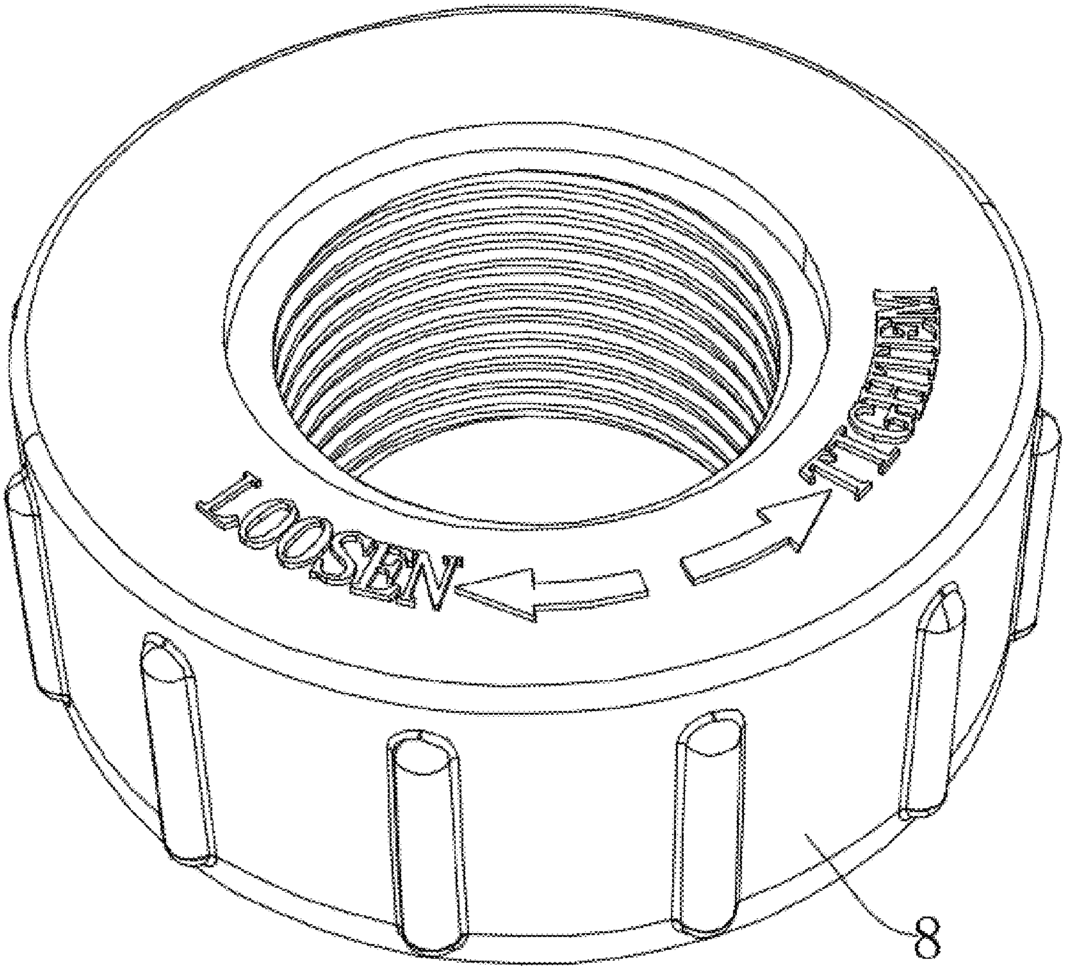
FIG. 5 is a schematic structural diagram of a knob of the fishing reel battery provided in the present invention.

In another aspect of this embodiment, as shown in FIG. 5, the surface of the knob 8 is provided with an adjustment arrow.

In the above technical solution, the adjustment arrow can provide prompts for users to facilitate adjustment of the knob 8.

However, as is well known to those skilled in the art, the working principles and wiring methods of the batteries 5, circuit board 11 and power indicator light 15 are commonplace, and all belong to conventional means or common general knowledge, which will not be described in detail here. Those skilled in the art can make any selection based on their needs or convenience.

The above are only preferred specific embodiments of the present invention, but the scope of protection of the present invention is not limited thereto. Any equivalent substitutions or changes made by any person skilled in the art within the technical scope disclosed herein according to the technical solutions of the present invention and its inventive concept shall be covered within the scope of protection of the present invention.

The invention claimed is:

1. A fishing reel battery, comprising a case, wherein two pairs of brackets are provided inside the case, fixing grooves are provided inside of a plurality of brackets, and a plurality of batteries are provided between the two pairs of brackets;

a top base, provided on top of the case, wherein a charging and discharging interface is fixed on an inner wall of the top base, a connecting piece is provided at a bottom of the charging and discharging interface, an outer wall of the top base is rotationally connected with a knob, and internal threads are provided on an inner wall of the knob;

a bottom base, provided at a bottom of the case, wherein a plurality of assembly holes are provided throughout a surface of the top base and a bottom of the bottom base, both the top base and bottom base are fixed to the case through screws, and outer walls of the case, top base and bottom base are defined with a plurality of positioning grooves; and a charging mechanism, provided at the bottom of the bottom base and used to power equipment.

2. The fishing reel battery according to claim 1, wherein the charging mechanism comprises a circuit board, a TYPE-C output interface, a USB output interface, a switch and a power indicator light, the circuit board is fixed at a bottom inner wall of the bottom base; the TYPE-C output interface, USB output interface, switch and power indicator light are all provided at the bottom of the bottom base, and electrically connected to the circuit board; and the circuit board is electrically connected to the batteries.

3. The fishing reel battery according to claim 1, wherein both a surface and the bottom of the case are provided with positioning bumps, and both a bottom of the top base and a surface of the bottom base are defined with grooves adapted to the positioning bumps.

4. The fishing reel battery according to claim 3, wherein the positioning bumps are integrally formed around the case.

* * * * *